(12) United States Patent
Wang et al.

(10) Patent No.: US 9,361,233 B2
(45) Date of Patent: Jun. 7, 2016

(54) METHOD AND APPARATUS FOR SHARED LINE UNIFIED CACHE

(71) Applicant: Intel Corporation, Santa Clara, CA (US)

(72) Inventors: Liang-Min Wang, Northborough, MA (US); John M. Morgan, Townsend, MA (US); Namakkal N. Venkatesan, Hillsboro, OR (US)

(73) Assignee: INTEL CORPORATION, Santa Clara, CA (US)

( * ) Notice: Subject to any disclaimer, the term of this patent is extended or adjusted under 35 U.S.C. 154(b) by 139 days.

(21) Appl. No.: 14/137,359

(22) Filed: Dec. 20, 2013

(65) Prior Publication Data

US 2015/0178199 A1 Jun. 25, 2015

(51) Int. Cl.
*G06F 12/02* (2006.01)
*G06F 12/08* (2016.01)
*G06F 12/12* (2016.01)

(52) U.S. Cl.
CPC ............ *G06F 12/084* (2013.01); *G06F 12/082* (2013.01); *G06F 12/126* (2013.01); *G06F 12/0811* (2013.01); *G06F 12/0831* (2013.01); *G06F 2212/1016* (2013.01); *G06F 2212/6042* (2013.01); *Y02B 60/1225* (2013.01)

(58) Field of Classification Search
CPC ... G06F 12/122; G06F 12/084; G06F 12/811; G06F 2212/6042
See application file for complete search history.

(56) References Cited

U.S. PATENT DOCUMENTS

| | | | |
|---|---|---|---|
| 6,347,362 B1* | 2/2002 | Schoinas et al. | 711/147 |
| 2007/0094450 A1* | 4/2007 | VanderWiel | G06F 12/126 711/133 |
| 2009/0006808 A1* | 1/2009 | Blumrich | G06F 15/17337 712/12 |
| 2009/0193196 A1* | 7/2009 | Kornegay et al. | 711/136 |
| 2014/0089591 A1* | 3/2014 | Moir et al. | 711/130 |

* cited by examiner

*Primary Examiner* — Edward Dudek, Jr.
(74) *Attorney, Agent, or Firm* — Nicholson De Vos Webster & Elliott LLP

(57) ABSTRACT

An apparatus and method for implementing a shared unified cache. For example, one embodiment of a processor comprises: a plurality of processor cores grouped into modules, wherein each module has at least two processor cores grouped therein; a plurality of level 1 (L1) caches, each L1 cache directly accessible by one of the processor cores; a level 2 (L2) cache associated with each module, the L2 cache directly accessible by each of the processor cores associated with its respective module; a shared unified cache to store data and/or instructions for each of the processor cores in each of the modules; and a cache management module to manage the cache lines in the shared unified cache using a first cache line eviction policy favoring cache lines which are shared across two or more modules and which are accessed relatively more frequently from the modules.

20 Claims, 14 Drawing Sheets

Shared Unified Cache 832

| Tag 890 | MID 891 | Shared 892 | Modified 893 | Invalid 894 | Counter 895 | Cache Line Data 896 |
|---|---|---|---|---|---|---|
| CL1 | 851 | 0 | 0 | 0 | TH-C | CL1 Data |
| CL2 | 853 | 1 | 0 | 0 | TH | CL2 Data |
| CL3 | 851 | 1 | 1 | 0 | TH-2 | CL3 Data |
| CL4 | 851 | 0 | 1 | 0 | TH-C | CL4 Data |
| CL5 | 852 | 1 | 0 | 0 | TH-1 | CL5 Data |
| CL6 | 853 | 1 | 0 | 0 | TH-2 | CL6 Data |

FIG. 8B

State Transition Table
1000

| | HIT | RD | WR | OTH* | RIS | WIS | Current State | Next State | S | M | I | D | C |
|---|---|---|---|---|---|---|---|---|---|---|---|---|---|
| (1) | 0 | x | x | x | x | x | x | x | x | x | x | x | dec |
| (2) | 1 | 1 | 0 | x | 0 | 0 | INV | EXC | 0 | 0 | 0 | mid | 0->th-c |
| (3) | 1 | 1 | 0 | 0 | 0 | 0 | EXC | EXC | 0 | 0 | 0 | x | 0->th-c |
| (4) | 1 | 1 | 0 | 0 | 0 | 0 | MOD | MOD | 0 | 0 | 0 | x | 0->th-c |
| (5) | 1 | 1 | 0 | x | 0 | 0 | SHD | SHD | 1 | 0 | 0 | x | th |
| (6) | 1 | 1 | 0 | x | 0 | 0 | SHM | SHM | 1 | 1 | 0 | x | th |
| (7) | 1 | 1 | 0 | 1 | 0 | 0 | EXC | SHD | 1 | 0 | 0 | x | th |
| (8) | 1 | 1 | 0 | 1 | 0 | 0 | MOD | SHM | 1 | 0 | 0 | x | th |
| (9) | 1 | 0 | 1 | x | 0 | 0 | INV | MOD | 0 | 1 | 0 | mid | 0->th-c |
| (10) | 1 | 0 | 1 | 0 | 0 | 0 | EXC | MOD | 0 | 1 | 0 | x | 0->th-c |
| (11) | 1 | 0 | 1 | 0 | 0 | 0 | MOD | MOD | 0 | 1 | 0 | x | 0->th-c |
| (12) | 1 | 0 | 1 | x | 0 | 0 | SHD | SHM | 1 | 1 | 0 | x | th |
| (13) | 1 | 0 | 1 | x | 0 | 0 | SHM | SHM | 1 | 1 | 0 | x | th |
| (14) | 1 | 0 | 1 | 1 | 0 | 0 | EXC | SHM | 1 | 1 | 0 | x | th |
| (15) | 1 | 0 | 1 | 1 | 0 | 0 | MOD | SHM | 1 | 1 | 0 | x | th |
| (16) | 1 | 0 | 0 | x | 1 | 0 | INV | SHD | 1 | 0 | 0 | mid | th |
| (17) | 1 | 0 | 0 | x | 1 | 0 | EXC | SHD | 1 | 0 | 0 | x | th |
| (18) | 1 | 0 | 0 | x | 1 | 0 | MOD | SHM | 1 | 1 | 0 | x | th |
| (19) | 1 | 0 | 0 | x | 1 | 0 | SHD | SHD | 1 | 0 | 0 | x | th |
| (20) | 1 | 0 | 0 | x | 1 | 0 | SHM | SHM | 1 | 1 | 0 | x | th |
| (21) | 1 | 0 | 0 | x | 0 | 1 | INV | SHM | 1 | 1 | 0 | mid | th |
| (22) | 1 | 0 | 0 | x | 0 | 1 | EXC | SHM | 1 | 1 | 0 | x | th |
| (23) | 1 | 0 | 0 | x | 0 | 1 | MOD | SHM | 1 | 1 | 0 | x | th |
| (24) | 1 | 0 | 0 | x | 0 | 1 | SHD | SHM | 1 | 1 | 0 | x | th |
| (25) | 1 | 0 | 0 | x | 0 | 1 | SHM | SHM | 1 | 1 | 0 | x | th |

*Fig. 10*

METHOD AND APPARATUS FOR SHARED LINE UNIFIED CACHE

BACKGROUND

1. Field of the Invention

This invention relates generally to the field of computer processors. More particularly, the invention relates to an apparatus and method for a shared line unified cache.

2. Description of the Related Art

Many current system on a chip (SoC) mobile processors do not have a level 3 (L3) cache (also referred to as a last level cache or LLC) because such a cache tends to increase power usage above the desired power threshold. In particular, because L3 caches are often supersets of Level 2 (L2) and Level 1 (L1) caches, they are typically very large and the implementation of a large cache adds power consumption and silicon cost to mobile SoC processors which cannot be tolerated in a low cost, low power product.

However, it would be desirable to utilize the performance provided by a L3 cache, particularly for certain types of applications. For example, when variables are shared by CPU cores, variable-sharing happens when applications are attempt to improve performance through sharing workloads by more than one CPU cores, without a unified cache, shared variables accessed by one CPU core can be evicted by another CPU core who tries to access the same variables. This type of interference is referred to as cache thrashing, and this type of interface is a critical issue for many embedded applications. A unified L3 cache provides common storage that can be accessed by all the CPU cores, so it reduces the frequency of cache thrashing as described above, which, in turn, improves system performance significantly.

Coherency between the L1, L2 and L3 caches may be provided with a cache coherency protocol such as the MESI (Modified, Exclusive, Shared, Invalid) protocol. Using the MESI protocol, every cache line is marked with one of the MESI states (e.g., coded in two additional bits in a cache directory or with the cache line):

Modified (M) State: In the M state, the cache line is present only in the current cache, and has been modified from the value in main memory (i.e., it is "dirty"). The cache is required to write the data back to main memory before permitting any other read of the dirty main memory state. Writing the data back to main memory changes the line to the Exclusive (E) state.

Exclusive (E) State: The cache line is present only in the current cache, but it matches main memory (i.e., it is "clean"). It may be changed to the Shared (S) state in response to a read request by another cache. Alternatively, it may be changed to the Modified (M) if written to.

Shared (S) State: Indicates that this cache line may be stored in other caches of the processor and matches the main memory (i.e., it is "clean"). The line may be discarded by changing to the Invalid (I) state.

Invalid (I) State: Indicates that this cache line is invalid within the current cache (i.e., unused).

BRIEF DESCRIPTION OF THE DRAWINGS

A better understanding of the present invention can be obtained from the following detailed description in conjunction with the following drawings, in which:

FIG. 8B illustrates additional details of one embodiment of a share unified cache;

FIG. 10 illustrates a state transition table showing states and state transitions;

DETAILED DESCRIPTION

In the following description, for the purposes of explanation, numerous specific details are set forth in order to provide a thorough understanding of the embodiments of the invention described below. It will be apparent, however, to one skilled in the art that the embodiments of the invention may be practiced without some of these specific details. In other instances, well-known structures and devices are shown in block diagram form to avoid obscuring the underlying principles of the embodiments of the invention.

Exemplary Processor Architectures and Data Types

Figure 1:
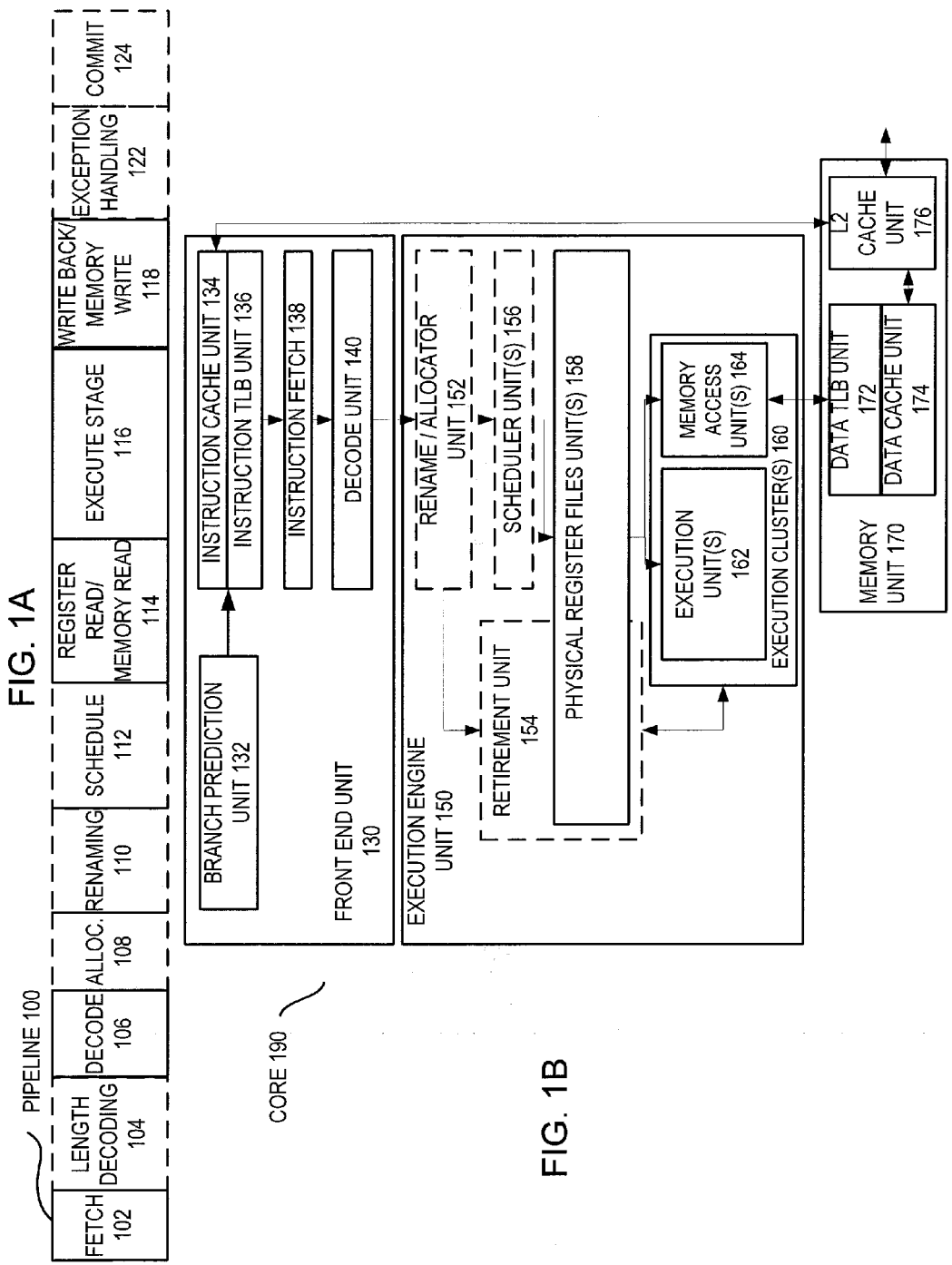
FIG. 1A is a block diagram illustrating both an exemplary in-order pipeline and an exemplary register renaming, out-of-order issue/execution pipeline according to embodiments of the invention.
FIG. 1B is a block diagram illustrating both an exemplary embodiment of an in-order architecture core and an exemplary register renaming, out-of-order issue/execution architecture core to be included in a processor according to embodiments of the invention.

FIG. 1A is a block diagram illustrating both an exemplary in-order pipeline and an exemplary register renaming, out-of-order issue/execution pipeline according to embodiments of the invention. FIG. 1B is a block diagram illustrating both an exemplary embodiment of an in-order architecture core and an exemplary register renaming, out-of-order issue/execution architecture core to be included in a processor according to embodiments of the invention. The solid lined boxes in FIGS. 1A-B illustrate the in-order pipeline and in-order core, while the optional addition of the dashed lined boxes illustrates the register renaming, out-of-order issue/execution pipeline and core. Given that the in-order aspect is a subset of the out-of-order aspect, the out-of-order aspect will be described.

In FIG. 1A, a processor pipeline 100 includes a fetch stage 102, a length decode stage 104, a decode stage 106, an allocation stage 108, a renaming stage 110, a scheduling (also known as a dispatch or issue) stage 112, a register read/ memory read stage 114, an execute stage 116, a write back/memory write stage 118, an exception handling stage 122, and a commit stage 124.

FIG. 1B shows processor core 190 including a front end unit 130 coupled to an execution engine unit 150, and both are coupled to a memory unit 170. The core 190 may be a reduced instruction set computing (RISC) core, a complex instruction set computing (CISC) core, a very long instruction word (VLIW) core, or a hybrid or alternative core type. As yet another option, the core 190 may be a special-purpose core, such as, for example, a network or communication core, compression engine, coprocessor core, general purpose computing graphics processing unit (GPGPU) core, graphics core, or the like.

The front end unit 130 includes a branch prediction unit 132 coupled to an instruction cache unit 134, which is coupled to an instruction translation lookaside buffer (TLB) 136, which is coupled to an instruction fetch unit 138, which is coupled to a decode unit 140. The decode unit 140 (or decoder) may decode instructions, and generate as an output one or more micro-operations, micro-code entry points, microinstructions, other instructions, or other control signals, which are decoded from, or which otherwise reflect, or are derived from, the original instructions. The decode unit 140 may be implemented using various different mechanisms. Examples of suitable mechanisms include, but are not limited to, look-up tables, hardware implementations, programmable logic arrays (PLAs), microcode read only memories (ROMs), etc. In one embodiment, the core 190 includes a microcode ROM or other medium that stores microcode for certain macroinstructions (e.g., in decode unit 140 or otherwise within the front end unit 130). The decode unit 140 is coupled to a rename/allocator unit 152 in the execution engine unit 150.

The execution engine unit 150 includes the rename/allocator unit 152 coupled to a retirement unit 154 and a set of one or more scheduler unit(s) 156. The scheduler unit(s) 156 represents any number of different schedulers, including reservations stations, central instruction window, etc. The scheduler unit(s) 156 is coupled to the physical register file(s) unit(s) 158. Each of the physical register file(s) units 158 represents one or more physical register files, different ones of which store one or more different data types, such as scalar integer, scalar floating point, packed integer, packed floating point, vector integer, vector floating point, status (e.g., an instruction pointer that is the address of the next instruction to be executed), etc. In one embodiment, the physical register file(s) unit 158 comprises a vector registers unit, a write mask registers unit, and a scalar registers unit. These register units may provide architectural vector registers, vector mask registers, and general purpose registers. The physical register file(s) unit(s) 158 is overlapped by the retirement unit 154 to illustrate various ways in which register renaming and out-of-order execution may be implemented (e.g., using a reorder buffer(s) and a retirement register file(s); using a future file(s), a history buffer(s), and a retirement register file(s); using a register maps and a pool of registers; etc.). The retirement unit 154 and the physical register file(s) unit(s) 158 are coupled to the execution cluster(s) 160. The execution cluster(s) 160 includes a set of one or more execution units 162 and a set of one or more memory access units 164. The execution units 162 may perform various operations (e.g., shifts, addition, subtraction, multiplication) and on various types of data (e.g., scalar floating point, packed integer, packed floating point, vector integer, vector floating point). While some embodiments may include a number of execution units dedicated to specific functions or sets of functions, other embodiments may include only one execution unit or multiple execution units that all perform all functions. The scheduler unit(s) 156, physical register file(s) unit(s) 158, and execution cluster(s) 160 are shown as being possibly plural because certain embodiments create separate pipelines for certain types of data/operations (e.g., a scalar integer pipeline, a scalar floating point/packed integer/packed floating point/vector integer/vector floating point pipeline, and/or a memory access pipeline that each have their own scheduler unit, physical register file(s) unit, and/or execution cluster—and in the case of a separate memory access pipeline, certain embodiments are implemented in which only the execution cluster of this pipeline has the memory access unit(s) 164). It should also be understood that where separate pipelines are used, one or more of these pipelines may be out-of-order issue/execution and the rest in-order.

The set of memory access units 164 is coupled to the memory unit 170, which includes a data TLB unit 172 coupled to a data cache unit 174 coupled to a level 2 (L2) cache unit 176. In one exemplary embodiment, the memory access units 164 may include a load unit, a store address unit, and a store data unit, each of which is coupled to the data TLB unit 172 in the memory unit 170. The instruction cache unit 134 is further coupled to a level 2 (L2) cache unit 176 in the memory unit 170. The L2 cache unit 176 is coupled to one or more other levels of cache and eventually to a main memory.

By way of example, the exemplary register renaming, out-of-order issue/execution core architecture may implement the pipeline 100 as follows: 1) the instruction fetch 138 performs the fetch and length decoding stages 102 and 104; 2) the decode unit 140 performs the decode stage 106; 3) the rename/allocator unit 152 performs the allocation stage 108 and renaming stage 110; 4) the scheduler unit(s) 156 performs the schedule stage 112; 5) the physical register file(s) unit(s) 158 and the memory unit 170 perform the register read/memory read stage 114; the execution cluster 160 perform the execute stage 116; 6) the memory unit 170 and the physical register file(s) unit(s) 158 perform the write back/memory write stage 118; 7) various units may be involved in the exception handling stage 122; and 8) the retirement unit 154 and the physical register file(s) unit(s) 158 perform the commit stage 124.

The core 190 may support one or more instructions sets (e.g., the x86 instruction set (with some extensions that have been added with newer versions); the MIPS instruction set of MIPS Technologies of Sunnyvale, Calif.; the ARM instruction set (with optional additional extensions such as NEON) of ARM Holdings of Sunnyvale, Calif.), including the instruction(s) described herein. In one embodiment, the core 190 includes logic to support a packed data instruction set extension (e.g., AVX1, AVX2, and/or some form of the generic vector friendly instruction format (U=0 and/or U=1), described below), thereby allowing the operations used by many multimedia applications to be performed using packed data.

It should be understood that the core may support multithreading (executing two or more parallel sets of operations or threads), and may do so in a variety of ways including time sliced multithreading, simultaneous multithreading (where a single physical core provides a logical core for each of the threads that physical core is simultaneously multithreading), or a combination thereof (e.g., time sliced fetching and decoding and simultaneous multithreading thereafter such as in the Intel® Hyperthreading technology).

While register renaming is described in the context of out-of-order execution, it should be understood that register renaming may be used in an in-order architecture. While the illustrated embodiment of the processor also includes separate instruction and data cache units 134/174 and a shared L2 cache unit 176, alternative embodiments may have a single internal cache for both instructions and data, such as, for example, a Level 1 (L1) internal cache, or multiple levels of internal cache. In some embodiments, the system may include a combination of an internal cache and an external cache that is external to the core and/or the processor. Alternatively, all of the cache may be external to the core and/or the processor.

Figure 2:
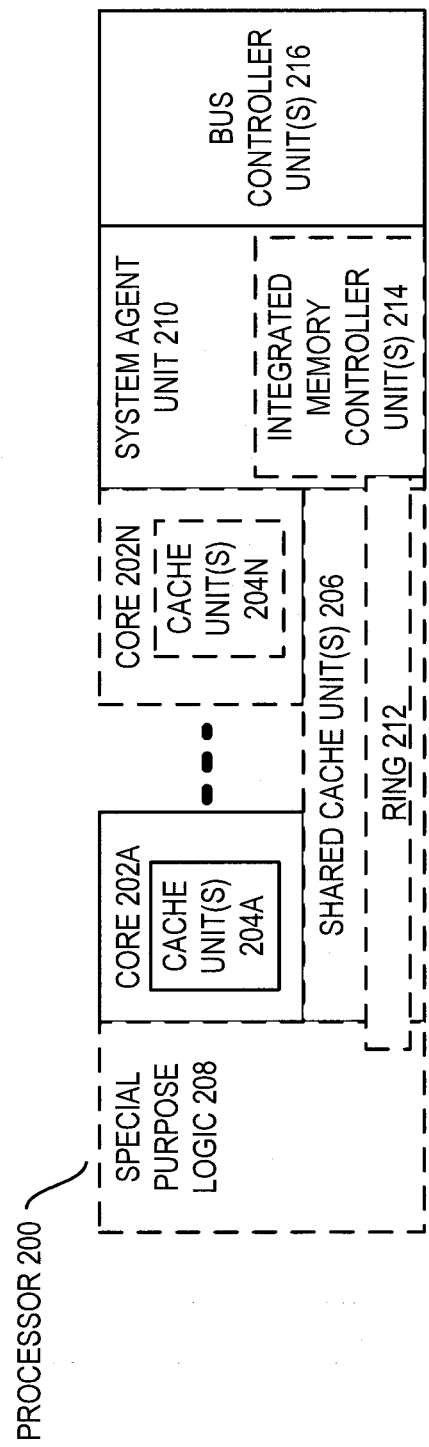
FIG. 2 is a block diagram of a single core processor and a multicore processor with integrated memory controller and graphics according to embodiments of the invention.

FIG. 2 is a block diagram of a processor 200 that may have more than one core, may have an integrated memory controller, and may have integrated graphics according to embodiments of the invention. The solid lined boxes in FIG. 2 illustrate a processor 200 with a single core 202A, a system agent 210, a set of one or more bus controller units 216, while the optional addition of the dashed lined boxes illustrates an alternative processor 200 with multiple cores 202A-N, a set of one or more integrated memory controller unit(s) 214 in the system agent unit 210, and special purpose logic 208.

Thus, different implementations of the processor 200 may include: 1) a CPU with the special purpose logic 208 being integrated graphics and/or scientific (throughput) logic (which may include one or more cores), and the cores 202A-N being one or more general purpose cores (e.g., general purpose in-order cores, general purpose out-of-order cores, a combination of the two); 2) a coprocessor with the cores 202A-N being a large number of special purpose cores intended primarily for graphics and/or scientific (throughput); and 3) a coprocessor with the cores 202A-N being a large number of general purpose in-order cores. Thus, the processor 200 may be a general-purpose processor, coprocessor or special-purpose processor, such as, for example, a network or communication processor, compression engine, graphics processor, GPGPU (general purpose graphics processing unit), a high-throughput many integrated core (MIC) coprocessor (including 30 or more cores), embedded processor, or the like. The processor may be implemented on one or more chips. The processor 200 may be a part of and/or may be implemented on one or more substrates using any of a number of process technologies, such as, for example, BiCMOS, CMOS, or NMOS.

The memory hierarchy includes one or more levels of cache within the cores, a set or one or more shared cache units 206, and external memory (not shown) coupled to the set of integrated memory controller units 214. The set of shared cache units 206 may include one or more mid-level caches, such as level 2 (L2), level 3 (L3), level 4 (L4), or other levels of cache, a last level cache (LLC), and/or combinations thereof. While in one embodiment a ring based interconnect unit 212 interconnects the integrated graphics logic 208, the set of shared cache units 206, and the system agent unit 210/integrated memory controller unit(s) 214, alternative embodiments may use any number of well-known techniques for interconnecting such units. In one embodiment, coherency is maintained between one or more cache units 206 and cores 202-A-N.

In some embodiments, one or more of the cores 202A-N are capable of multi-threading. The system agent 210 includes those components coordinating and operating cores 202A-N. The system agent unit 210 may include for example a power control unit (PCU) and a display unit. The PCU may be or include logic and components needed for regulating the power state of the cores 202A-N and the integrated graphics logic 208. The display unit is for driving one or more externally connected displays.

The cores 202A-N may be homogenous or heterogeneous in terms of architecture instruction set; that is, two or more of the cores 202A-N may be capable of execution the same instruction set, while others may be capable of executing only a subset of that instruction set or a different instruction set. In one embodiment, the cores 202A-N are heterogeneous and include both the "small" cores and "big" cores described below.

FIGS. 3-6 are block diagrams of exemplary computer architectures. Other system designs and configurations known in the arts for laptops, desktops, handheld PCs, personal digital assistants, engineering workstations, servers, network devices, network hubs, switches, embedded processors, digital signal processors (DSPs), graphics devices, video game devices, set-top boxes, micro controllers, cell phones, portable media players, hand held devices, and various other electronic devices, are also suitable. In general, a huge variety of systems or electronic devices capable of incorporating a processor and/or other execution logic as disclosed herein are generally suitable.

Figure 3:
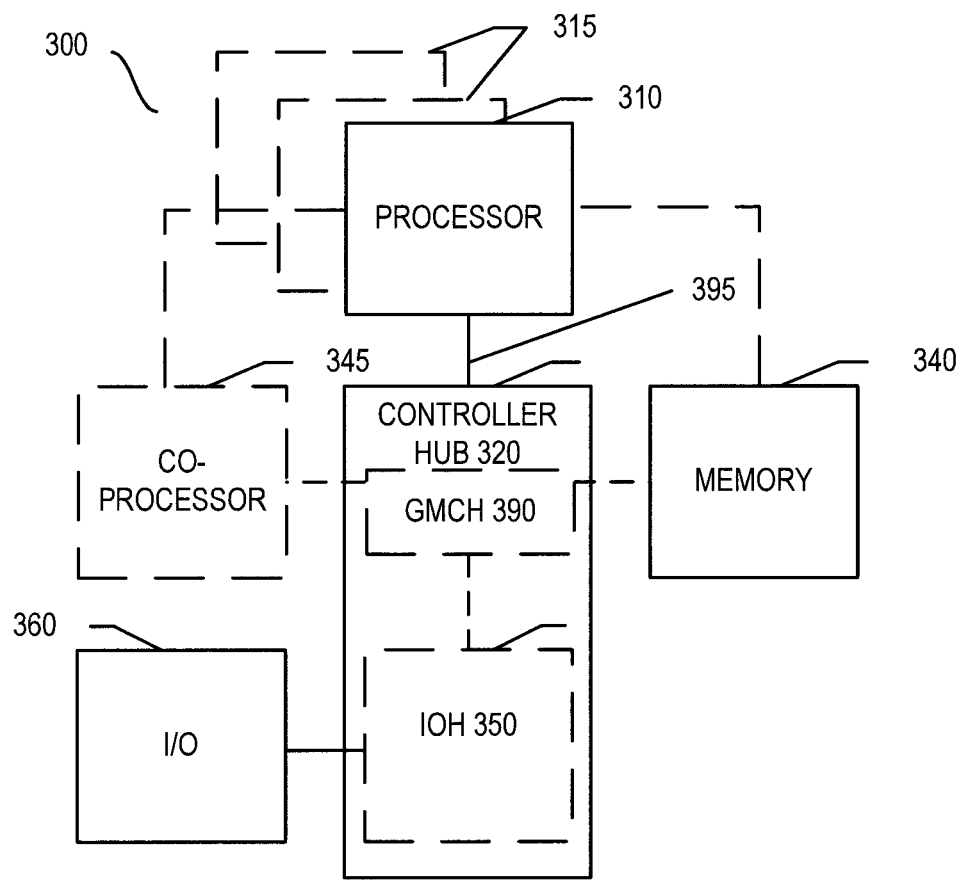
FIG. 3 illustrates a block diagram of a system in accordance with one embodiment of the present invention.

Referring now to FIG. 3, shown is a block diagram of a system 300 in accordance with one embodiment of the present invention. The system 300 may include one or more processors 310, 315, which are coupled to a controller hub 320. In one embodiment the controller hub 320 includes a graphics memory controller hub (GMCH) 390 and an Input/Output Hub (IOH) 350 (which may be on separate chips); the GMCH 390 includes memory and graphics controllers to which are coupled memory 340 and a coprocessor 345; the IOH 350 is couples input/output (I/O) devices 360 to the GMCH 390. Alternatively, one or both of the memory and graphics controllers are integrated within the processor (as described herein), the memory 340 and the coprocessor 345 are coupled directly to the processor 310, and the controller hub 320 in a single chip with the IOH 350.

The optional nature of additional processors 315 is denoted in FIG. 3 with broken lines. Each processor 310, 315 may include one or more of the processing cores described herein and may be some version of the processor 200.

The memory 340 may be, for example, dynamic random access memory (DRAM), phase change memory (PCM), or a combination of the two. For at least one embodiment, the controller hub 320 communicates with the processor(s) 310, 315 via a multi-drop bus, such as a frontside bus (FSB), point-to-point interface such as QuickPath Interconnect (QPI), or similar connection 395.

In one embodiment, the coprocessor 345 is a special-purpose processor, such as, for example, a high-throughput MIC processor, a network or communication processor, compression engine, graphics processor, GPGPU, embedded processor, or the like. In one embodiment, controller hub 320 may include an integrated graphics accelerator.

There can be a variety of differences between the physical resources 310, 315 in terms of a spectrum of metrics of merit including architectural, microarchitectural, thermal, power consumption characteristics, and the like.

In one embodiment, the processor 310 executes instructions that control data processing operations of a general type. Embedded within the instructions may be coprocessor instructions. The processor 310 recognizes these coprocessor instructions as being of a type that should be executed by the attached coprocessor 345. Accordingly, the processor 310 issues these coprocessor instructions (or control signals representing coprocessor instructions) on a coprocessor bus or other interconnect, to coprocessor 345. Coprocessor(s) 345 accept and execute the received coprocessor instructions.

Figure 4:
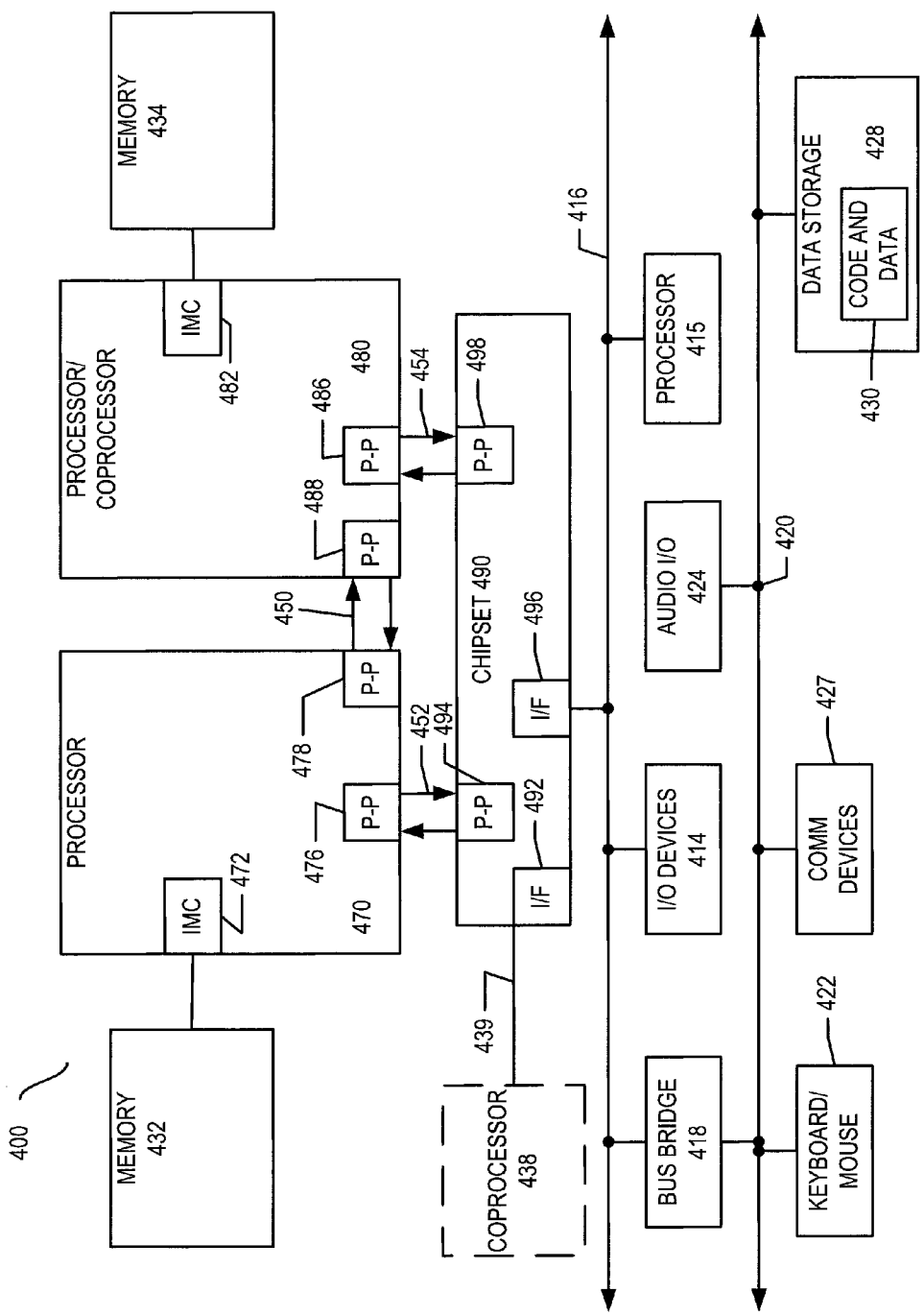
FIG. 4 illustrates a block diagram of a second system in accordance with an embodiment of the present invention.

Referring now to FIG. 4, shown is a block diagram of a first more specific exemplary system 400 in accordance with an embodiment of the present invention. As shown in FIG. 4, multiprocessor system 400 is a point-to-point interconnect system, and includes a first processor 470 and a second processor 480 coupled via a point-to-point interconnect 450. Each of processors 470 and 480 may be some version of the processor 200. In one embodiment of the invention, processors 470 and 480 are respectively processors 310 and 315, while coprocessor 438 is coprocessor 345. In another embodiment, processors 470 and 480 are respectively processor 310 coprocessor 345.

Processors 470 and 480 are shown including integrated memory controller (IMC) units 472 and 482, respectively. Processor 470 also includes as part of its bus controller units point-to-point (P-P) interfaces 476 and 478; similarly, second processor 480 includes P-P interfaces 486 and 488. Processors 470, 480 may exchange information via a point-to-point (P-P) interface 450 using P-P interface circuits 478, 488. As shown in FIG. 4, IMCs 472 and 482 couple the processors to respective memories, namely a memory 432 and a memory 434, which may be portions of main memory locally attached to the respective processors.

Processors 470, 480 may each exchange information with a chipset 490 via individual P-P interfaces 452, 454 using point to point interface circuits 476, 494, 486, 498. Chipset 490 may optionally exchange information with the coprocessor 438 via a high-performance interface 439. In one embodiment, the coprocessor 438 is a special-purpose processor, such as, for example, a high-throughput MIC processor, a network or communication processor, compression engine, graphics processor, GPGPU, embedded processor, or the like.

A shared cache (not shown) may be included in either processor or outside of both processors, yet connected with the processors via P-P interconnect, such that either or both processors' local cache information may be stored in the shared cache if a processor is placed into a low power mode.

Chipset 490 may be coupled to a first bus 416 via an interface 496. In one embodiment, first bus 416 may be a Peripheral Component Interconnect (PCI) bus, or a bus such as a PCI Express bus or another third generation I/O interconnect bus, although the scope of the present invention is not so limited.

As shown in FIG. 4, various I/O devices 414 may be coupled to first bus 416, along with a bus bridge 418 which couples first bus 416 to a second bus 420. In one embodiment, one or more additional processor(s) 415, such as coprocessors, high-throughput MIC processors, GPGPU's, accelerators (such as, e.g., graphics accelerators or digital signal processing (DSP) units), field programmable gate arrays, or any other processor, are coupled to first bus 416. In one embodiment, second bus 420 may be a low pin count (LPC) bus. Various devices may be coupled to a second bus 420 including, for example, a keyboard and/or mouse 422, communication devices 427 and a storage unit 428 such as a disk drive or other mass storage device which may include instructions/code and data 430, in one embodiment. Further, an audio I/O 424 may be coupled to the second bus 420. Note that other architectures are possible. For example, instead of the point-to-point architecture of FIG. 4, a system may implement a multi-drop bus or other such architecture.

Figure 5:
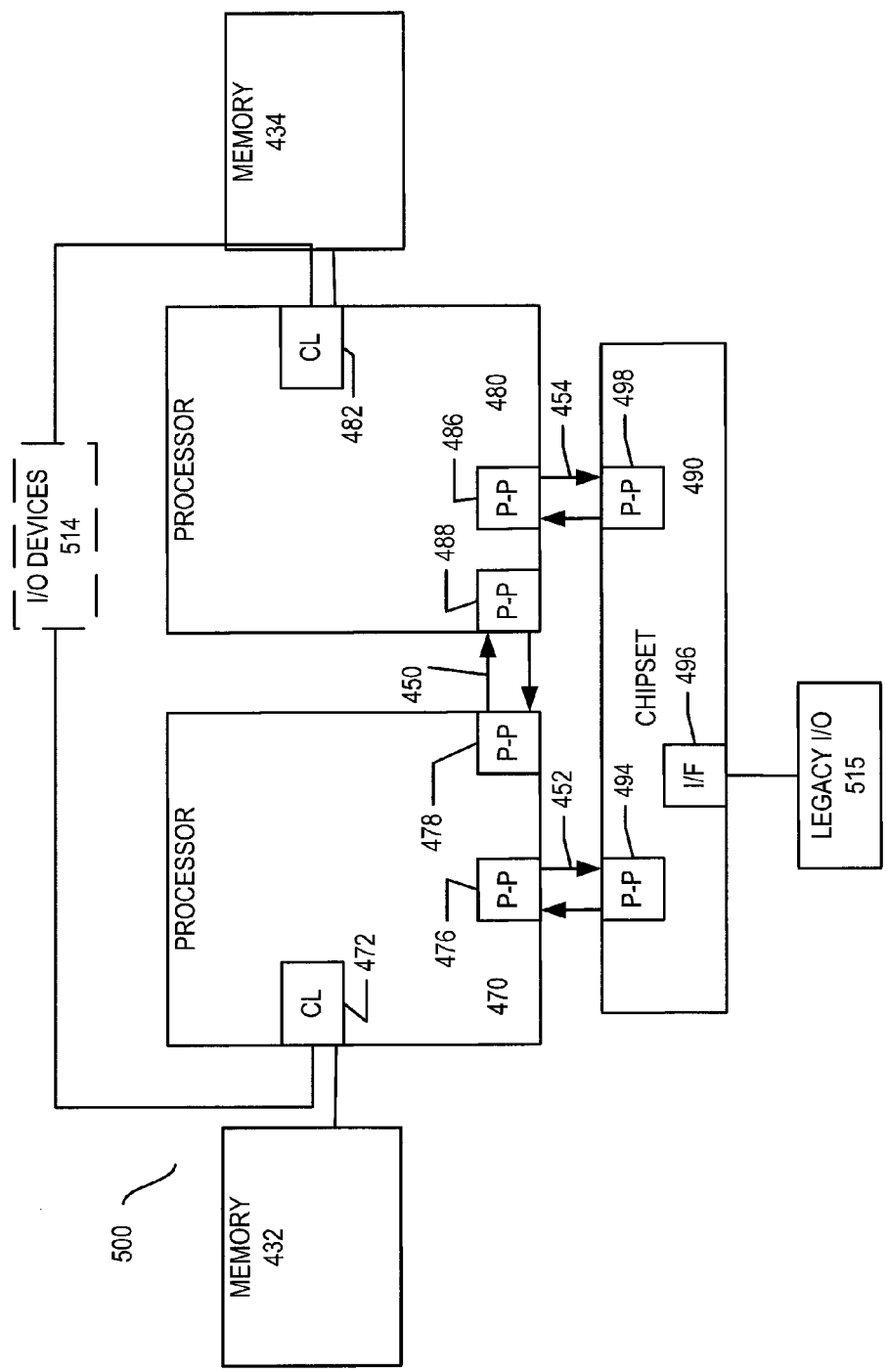
FIG. 5 illustrates a block diagram of a third system in accordance with an embodiment of the present invention.

Referring now to FIG. 5, shown is a block diagram of a second more specific exemplary system 500 in accordance with an embodiment of the present invention. Like elements in FIGS. 4 and 5 bear like reference numerals, and certain aspects of FIG. 4 have been omitted from FIG. 5 in order to avoid obscuring other aspects of FIG. 5.

FIG. 5 illustrates that the processors 470, 480 may include integrated memory and I/O control logic ("CL") 472 and 482, respectively. Thus, the CL 472, 482 include integrated memory controller units and include I/O control logic. FIG. 5 illustrates that not only are the memories 432, 434 coupled to the CL 472, 482, but also that I/O devices 514 are also coupled to the control logic 472, 482. Legacy I/O devices 515 are coupled to the chipset 490.

Figure 6:
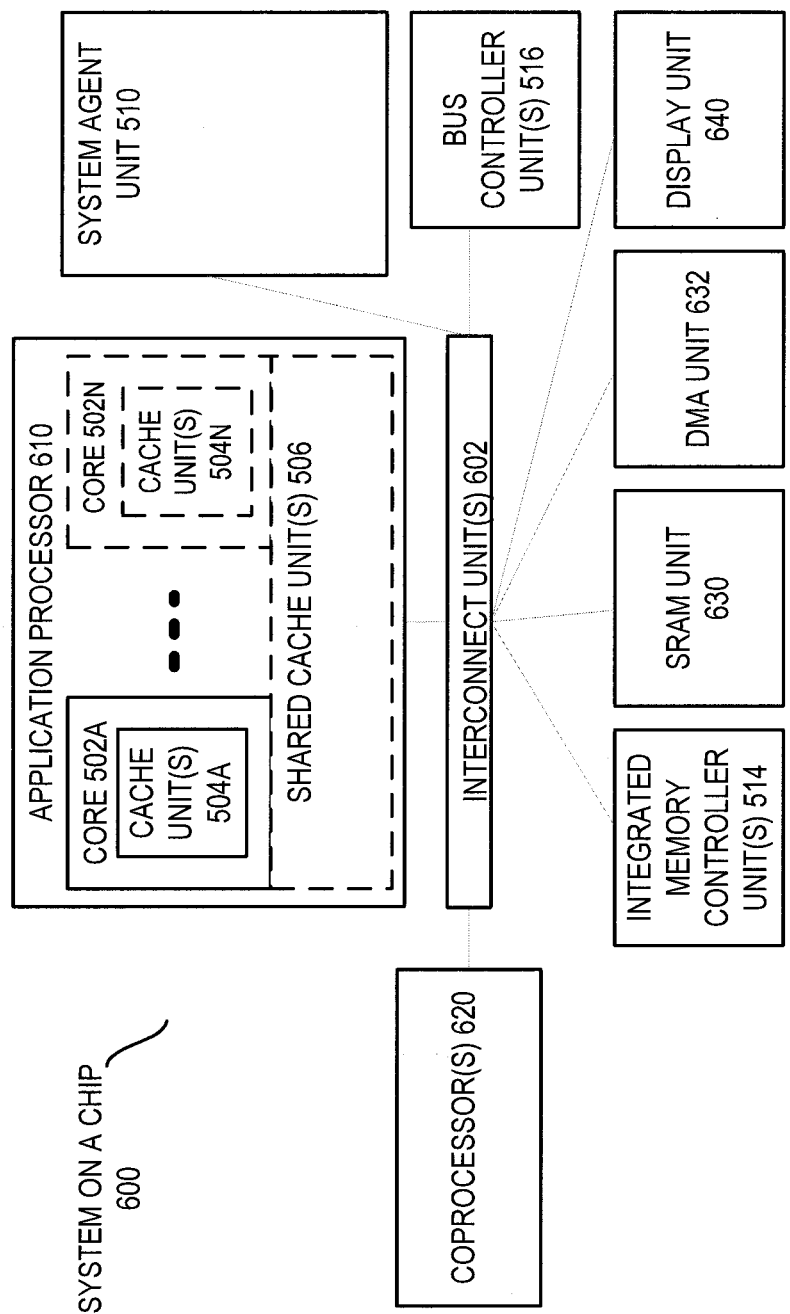
FIG. 6 illustrates a block diagram of a system on a chip (SoC) in accordance with an embodiment of the present invention.

Referring now to FIG. 6, shown is a block diagram of a SoC 600 in accordance with an embodiment of the present invention. Similar elements in FIG. 2 bear like reference numerals. Also, dashed lined boxes are optional features on more advanced SoCs. In FIG. 6, an interconnect unit(s) 602 is coupled to: an application processor 610 which includes a set of one or more cores 202A-N and shared cache unit(s) 206; a system agent unit 210; a bus controller unit(s) 216; an integrated memory controller unit(s) 214; a set or one or more coprocessors 620 which may include integrated graphics logic, an image processor, an audio processor, and a video processor; an static random access memory (SRAM) unit 630; a direct memory access (DMA) unit 632; and a display unit 640 for coupling to one or more external displays. In one embodiment, the coprocessor(s) 620 include a special-purpose processor, such as, for example, a network or communication processor, compression engine, GPGPU, a high-throughput MIC processor, embedded processor, or the like.

Embodiments of the mechanisms disclosed herein may be implemented in hardware, software, firmware, or a combination of such implementation approaches. Embodiments of the invention may be implemented as computer programs or program code executing on programmable systems comprising at least one processor, a storage system (including volatile and non-volatile memory and/or storage elements), at least one input device, and at least one output device.

Program code, such as code 430 illustrated in FIG. 4, may be applied to input instructions to perform the functions described herein and generate output information. The output information may be applied to one or more output devices, in known fashion. For purposes of this application, a processing system includes any system that has a processor, such as, for example; a digital signal processor (DSP), a microcontroller, an application specific integrated circuit (ASIC), or a microprocessor.

The program code may be implemented in a high level procedural or object oriented programming language to communicate with a processing system. The program code may also be implemented in assembly or machine language, if desired. In fact, the mechanisms described herein are not limited in scope to any particular programming language. In any case, the language may be a compiled or interpreted language.

One or more aspects of at least one embodiment may be implemented by representative instructions stored on a machine-readable medium which represents various logic within the processor, which when read by a machine causes the machine to fabricate logic to perform the techniques described herein. Such representations, known as "IP cores" may be stored on a tangible, machine readable medium and supplied to various customers or manufacturing facilities to load into the fabrication machines that actually make the logic or processor.

Such machine-readable storage media may include, without limitation, non-transitory, tangible arrangements of articles manufactured or formed by a machine or device, including storage media such as hard disks, any other type of disk including floppy disks, optical disks, compact disk read-only memories (CD-ROMs), compact disk rewritable's (CD-RWs), and magneto-optical disks, semiconductor devices such as read-only memories (ROMs), random access memories (RAMs) such as dynamic random access memories (DRAMs), static random access memories (SRAMs), erasable programmable read-only memories (EPROMs), flash memories, electrically erasable programmable read-only memories (EEPROMs), phase change memory (PCM), magnetic or optical cards, or any other type of media suitable for storing electronic instructions.

Accordingly, embodiments of the invention also include non-transitory, tangible machine-readable media containing instructions or containing design data, such as Hardware Description Language (HDL), which defines structures, circuits, apparatuses, processors and/or system features described herein. Such embodiments may also be referred to as program products.

In some cases, an instruction converter may be used to convert an instruction from a source instruction set to a target instruction set. For example, the instruction converter may translate (e.g., using static binary translation, dynamic binary translation including dynamic compilation), morph, emulate, or otherwise convert an instruction to one or more other instructions to be processed by the core. The instruction converter may be implemented in software, hardware, firmware, or a combination thereof. The instruction converter may be on processor, off processor, or part on and part off processor.

Figure 7:
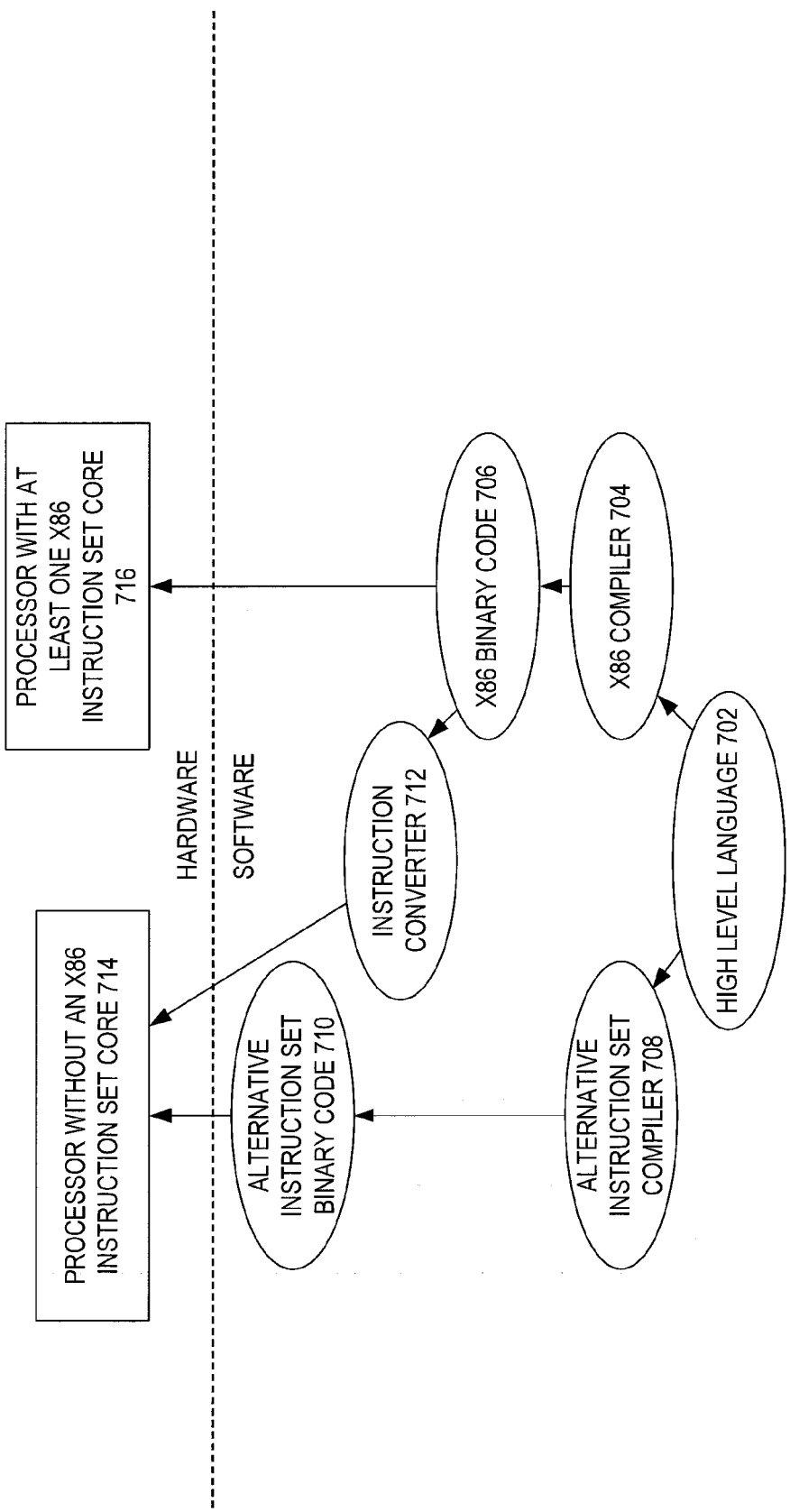
FIG. 7 illustrates a block diagram contrasting the use of a software instruction converter to convert binary instructions in a source instruction set to binary instructions in a target instruction set according to embodiments of the invention.

FIG. 7 is a block diagram contrasting the use of a software instruction converter to convert binary instructions in a source instruction set to binary instructions in a target instruction set according to embodiments of the invention. In the illustrated embodiment, the instruction converter is a software instruction converter, although alternatively the instruction converter may be implemented in software, firmware, hardware, or various combinations thereof. FIG. 7 shows a program in a high level language 702 may be compiled using an x86 compiler 704 to generate x86 binary code 706 that may be natively executed by a processor with at least one x86 instruction set core 716. The processor with at least one x86 instruction set core 716 represents any processor that can perform substantially the same functions as an Intel processor with at least one x86 instruction set core by compatibly executing or otherwise processing (1) a substantial portion of the instruction set of the Intel x86 instruction set core or (2) object code versions of applications or other software targeted to run on an Intel processor with at least one x86 instruction set core, in order to achieve substantially the same result as an Intel processor with at least one x86 instruction set core. The x86 compiler 704 represents a compiler that is operable to generate x86 binary code 706 (e.g., object code) that can, with or without additional linkage processing, be executed on the processor with at least one x86 instruction set core 716. Similarly, FIG. 7 shows the program in the high level language 702 may be compiled using an alternative instruction set compiler 708 to generate alternative instruction set binary code 710 that may be natively executed by a processor without at least one x86 instruction set core 714 (e.g., a processor with cores that execute the MIPS instruction set of MIPS Technologies of Sunnyvale, Calif. and/or that execute the ARM instruction set of ARM Holdings of Sunnyvale, Calif.). The instruction converter 712 is used to convert the x86 binary code 706 into code that may be natively executed by the processor without an x86 instruction set core 714. This converted code is not likely to be the same as the alternative instruction set binary code 710 because an instruction converter capable of this is difficult to make; however, the converted code will accomplish the general operation and be made up of instructions from the alternative instruction set. Thus, the instruction converter 712 represents software, firmware, hardware, or a combination thereof that, through emulation, simulation or any other process, allows a processor or other electronic device that does not have an x86 instruction set processor or core to execute the x86 binary code 706.

Apparatus and Method for Shared Line Unified Cache

The embodiments described herein include a new cache coherency protocol to enable a smaller-sized cache to serve as a unified cache (e.g., a Level 3 cache), favoring those cache lines that are shared by multiple cores (in one embodiment, storing only those cache lines shared by multiple cores). In one embodiment, the new cache coherency protocol is an extension of the existing MESI cache coherency protocol and is compatible with the existing MESI cache coherency protocol currently implemented in existing processor architectures (e.g., including, but not limited to, the Intel Atom™ architecture). It should be noted, however, that the techniques described herein may be implemented as an extension to other cache coherency protocols including, for example, the MOESI protocol, which adds the Owned (O) state indicating that only the "owner" has the right to make changes to the line; and MESIF, which adds the Forward (F) state indicating that a cache should act as a designated responder for any requests for a given line cache line.

Figure 8A:
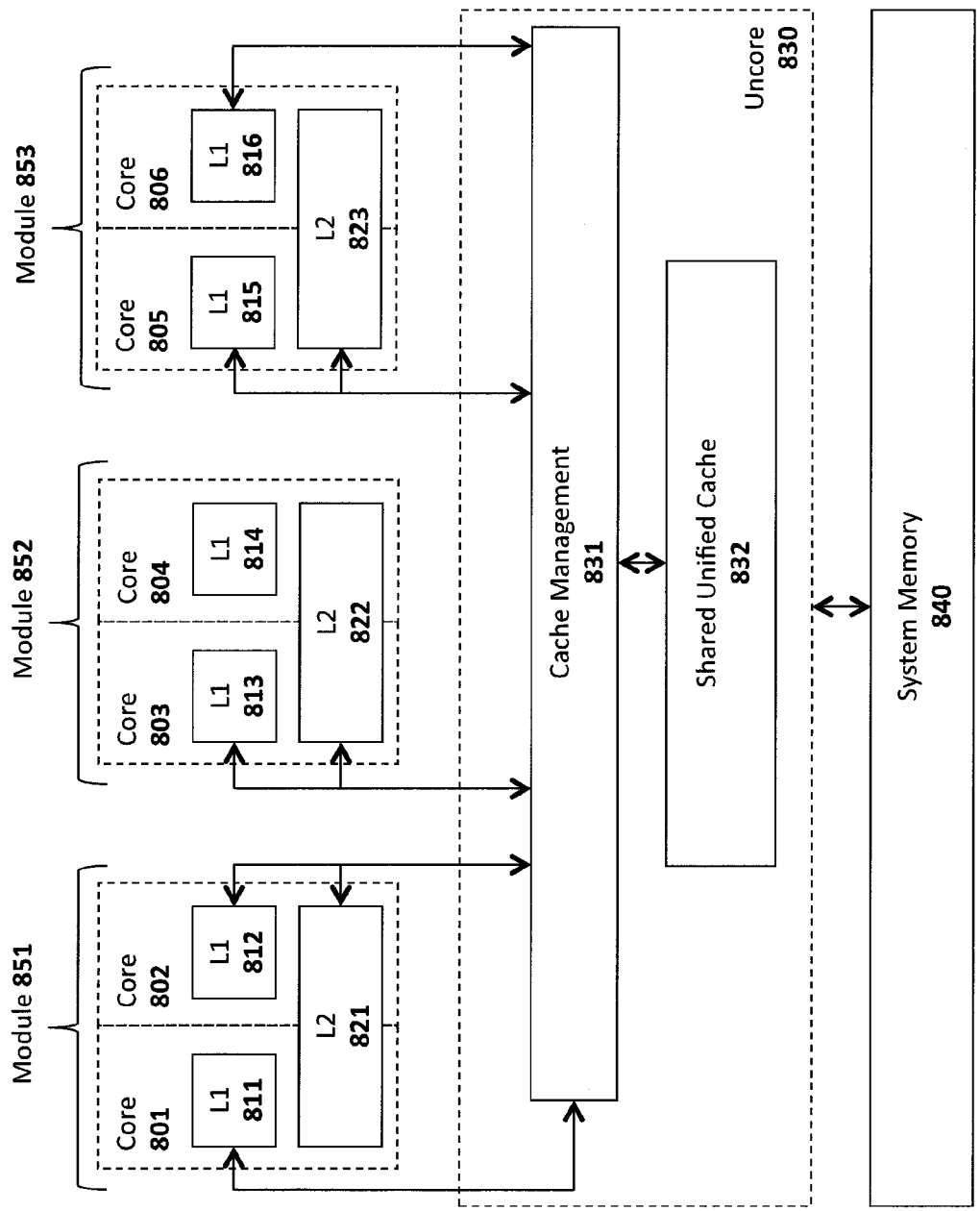
FIG. 8A illustrates one embodiment of a system architecture for a shared unified cache.

One embodiment will be described with respect to FIG. 8A, which illustrates a processor (e.g., a system on a chip (SoC)) with six cores 801-806, each having a dedicated L1 cache 811-816, respectively. The cores are logically grouped into modules 851-853, with the cores in each module sharing a L2 cache 821-823. For example, cores 801-802 in module 851 share L2 cache 821; cores 803-804 in module 852 share L2 cache 822; and cores 805-806 in module 853 share L2 cache 823.

An "uncore" component 830 provides for inter-core/inter-module communication and also includes cache management logic 831 for implementing a cache management techniques described herein. In particular, in one embodiment, the cache management logic 831 manages the state of each of the cache lines within a shared unified cache 832 utilizing the shared cache management protocol described below. Additionally, the uncore component 830 may couple the cores (and caches) to an interconnect such as a quick path interconnect (QPI) or other suitable type of interconnect to couple the cores 801-806 to a system memory 840 and/or other system components.

In one embodiment, the cache management logic 831 implements a cache management protocol to maintain cache lines in the shared unified cache 832 which are shared across two or more modules 851-853. As discussed below, the cache management logic 831 may implement a cache management protocol with an eviction policy favoring those cache lines which are shared across modules 851-853. In one embodiment, the cache management protocol may be applied only to the unified cache 832 (i.e., the cache management logic 831 may implement other cache management techniques for the L1 and L2 caches such as existing MESI or MOESI). In one embodiment, as a result of the techniques described herein favoring shared cache lines, the shared unified cache 832 is not required to be larger than its lower level cache (e.g., the L2 caches 821-823), in contrast to prior implementations in which the L3 cache is a superset of the L1 and L2 caches.

FIG. 8B illustrates an exemplary set of entries within a shared unified cache 832, including a tag value 890 uniquely identifying the cache line (e.g., using a portion of the main memory address); a set of module identification (MID) bits 891 to identify the module 851-853 which initially accessed the cache line (e.g., causing the cache line to move from the invalid state to a modified state, exclusive state, or shared state); a shared bit 892 to indicate if the cache line is being shared between more than one module; a modified bit 893 to indicate if the cache line has been modified; an invalid bit 894 to indicate if the cache line is valid; a counter value 895 to indicate the value of a counter associated with the cache line (accessed by a least recently used (LRU) eviction algorithm as discussed below); and the cache line data 896.

The MID bits 891 may be appended to or added to the tag for each cache line in the shared unified cache 832 (e.g., in addition to the existing status bits). In one embodiment, the MID status bits are used to determine whether a current cache-hit is from a core in a different module than the module identified by the stored MID (recall that cores in the same module share the same L2 cache). In one embodiment, each time a module accesses a cache line, the MID value 891 is updated to reflect the identity of that module. In an alternate embodiment, when a cache line is initially moved out of an invalid state by a module, the MID value for that module is maintained for that cache line (i.e., even when the line is subsequently accessed by a different module).

In the example shown in FIG. 8B, the MID bits 891 for the first cache line indicate module 851 because the line was previously accessed by module 851. If a subsequent hit on the cache line indicates modules 852 or 853 (e.g., a hit from cores 803-806), then the shared (S) bit 892 may be set to indicate that the line is shared between modules. In one embodiment, the cache management module includes comparator logic to compare the MID stored in the cache line with the MID associated with the current module causing a hit on the cache line.

In addition, the counter 895 may be set to a threshold value ("TH") in response to a hit from a different module and may then be decremented on each clock cycle for which there is no hit to the cache line (a hit from the same module may leave the counter value unchanged). For example, the counter for cache line 2 (CL2) in FIG. 8B is set to TH (indicating that the last hit was from a different module); the counters for cache line 3 (CL3) and cache line 6 (CL6) are set to TH−2 (indicating that two clock cycles have passed since the last cache line hit); and the counter for cache line 5 (CL5) is set to TH−1 (indicating one clock cycle since the last cache line hit).

The counter values of TH-C in cache lines CL1 and CL4 indicate a counter value which is less than TH and greater than or equal to zero. In one embodiment, this intermediate value is set in response to an access to a cache line by a single module (e.g., such that the line is not yet designated as "shared" by multiple modules). This is done so that a line which is not identified as "shared" (e.g., shared bit=0) may be maintained in the cache for a period of time until it is referenced (and potentially becomes shared). In other words, when a line is initially accessed by a single core, the counter may be given a value less than TH. It may subsequently be changed to TH (if accessed by a different module) or decremented down to 0 as the result of no cache hits (i.e., this smaller value TH-C denotes the difference between a cache line that was referenced and the cache line that was never referenced).

The cache management logic 831 may then execute a least recently used (LRU) replacement policy to favor cache entries that have the share-bit 892 set and relatively higher counter values. The end result is that cache lines which are shared between modules and have a relatively high hit rate will be kept in the shared unified cache 832 whereas cache lines which are not shared between modules and/or have low hit rates will be evicted. Consequently, the shared unified cache 832 is an efficient, relatively small shared cache which may be used to exchange data between modules.

Figure 8C:
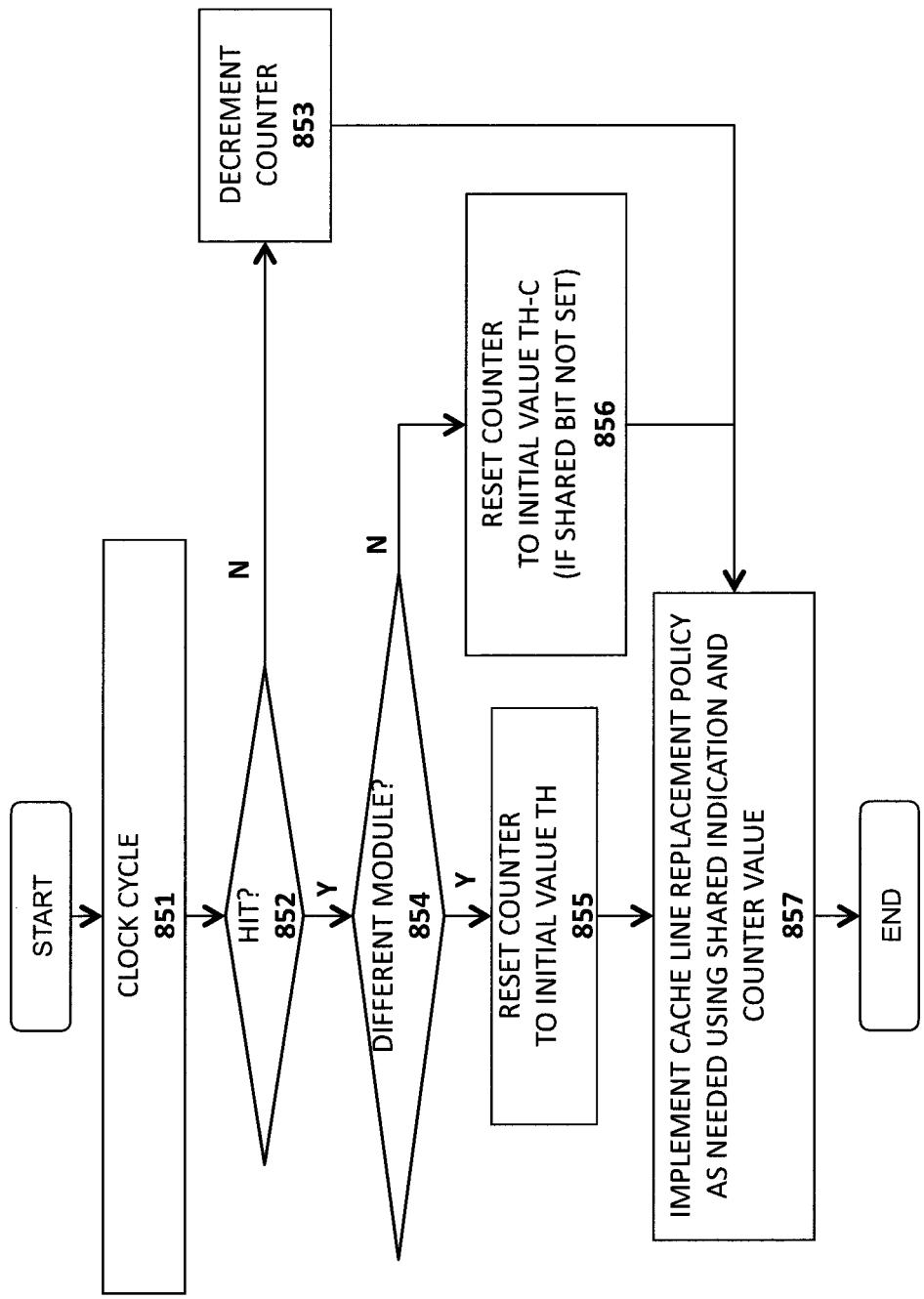
FIG. 8C illustrates one embodiment of a method for a shared unified cache.

FIG. 8C illustrates one embodiment of a method for implementing a shared unified cache. A new processor clock cycle is initiated at 851. If there is no hit on a given cache line, determined at 852, then at 853, the counter associated with that cache line is decremented. If there is a hit on the cache line, then at 854, a determination is made as to whether the module ID associated with the cache line matches the identity of the module currently accessing the cache line. If the access is from a different module, then at 855 the counter associated with the cache line is reset to its threshold value TH. If the access is not from a different module (and the shared bit is not set), then at 856 the counter associated with the cache line is reset to the threshold value TH-C. At 857, a cache line eviction policy is implemented to evict cache lines based on the shared indication for the cache lines, and the counter value. As discussed above, in one embodiment, the eviction policy favors those cache lines which are shared between modules and which have relatively higher counter values (indicating more frequent hits from different modules). Given the fact that non-shared lines will tend to have lower counter values (e.g., starting at TH-C rather than TH), the cache management logic may simply evict those entries having the lowest counter values).

In addition, in one embodiment, cache hints may be provided to enable the application designer to manage whether the target data should be placed in the unified cache and/or the L2/L1 caches. For example, for a load/store operation, the user may indicate an intent to share the data, thereby causing the cache management module to store the data in the shared unified cache 832.

Figure 9:
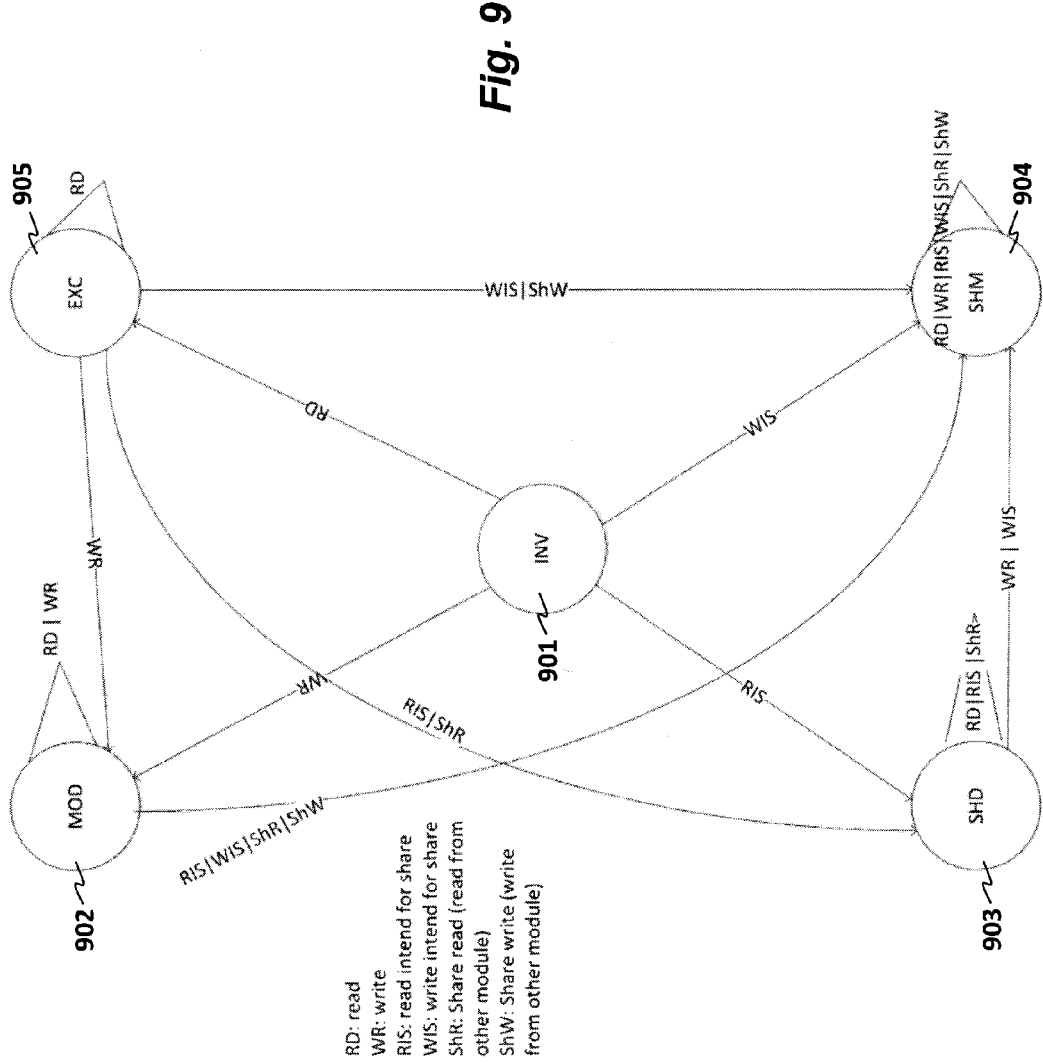
FIG. 9 illustrates a state transition diagram showing states and state transitions.

A state transition diagram is illustrated in FIG. 9 showing various cache line states and transitions between the sates. In addition, a state transition table 1000 indicating exemplary states and state transitions is illustrated in FIG. 10. This embodiment may be implemented under control of the cache management logic 831 illustrated in FIG. 8A using the cache entry state status bits illustrated in FIG. 8B:

Shared (S): cache line is shared between different cores
Modified (M): cache line has been modified
Invalid (I): cache line is invalid
Module ID (D): module ID of the source cache line
Counter (C): cache entry LRU replacement counter The cache states managed by the cache management logic 831 in this embodiment include:

Modified (MOD) 902: the cache line has been modified
Exclusive (EXC) 905: the cache line has only been accessed from one module
Shared (SHD) 903: the cache line has been accessed by more than one module
Shared-Modified (SHM) 904: the cache line has been access by more than one module and the cache line has been modified
Invalid (INV) 901: this cache line is not valid The following input variables are employed in one embodiment to cause the cache management logic 831 to transition between states:

HIT: a cache-tag HIT
RD: a cache-ReaD
WR: a cache-WRite
MID: Module ID
RIS: read Intend for Share (a hint to indicate that the line is intended to be shared across cores/modules)
WIS: write Intend for Share (a hint to indicate that the line is intended to be shared across cores/modules)

In the state transition table 1000 illustrated in FIG. 10, an X indicates that the value of the input variable can be 1 or 0, a 1 indicates that the input variable is set (condition is true), and a 0 indicates that the input value is not set (condition is false).

The first row (1) of the state transition table 1000 indicates that no hit has taken place on the cache line for this processor cycle (i.e., HIT=0). As such, the counter value (C) is decremented as discussed above. The remaining rows identify transitions for cache hits.

In rows 2, 9, 16, and 21, the cache line has been accessed and moved from an invalid state to an exclusive state (row 2), a modified state (row 9), a shared state (row 16) and a shared modified state (row 21). Consequently, as indicated in column D, a module ID (MID) is stored identifying the module which moved the cache line out of the invalid state. In rows 2 and 9, the operation is a read (RD) and write (WR), respectively. As a result, the cache line does not enter into the shared state (as indicated by the S bit being set to 0) and the counter value is therefore set to the intermediate value TH-C. In contrast, in rows 16 and 21, the cache line has been placed in a shared state as the result of read-intend-to-share (RIS) and write-intend-to-share (WIS) operations, respectively. Thus, the counter value is set to the threshold value (TH). Note that for any row where the shared (S) bit is set to 1, the counter value is set to the threshold TH and for any row where the shared bit is set to 0, the counter value is the intermediate value TH-C.

In rows 7, 8, 14, and 15, a hit has been registered from a different module, as indicated in the OTH column (OTHer which is (MID!=D)). In row 7, the cache line has moved from an exclusive state to a shared state in response to a read (RD); in row 8, the cache line has moved from a modified state to a shared modified state in response to a read (RD); in row 14, the cache line has moved from a exclusive state to a shared modified state in response to a write (WR); and in row 15, the cache line has moved from a modified state to a shared modified state in response to a write (WR). In all cases, the counter value is set to the threshold (TH).

Figure 11A:
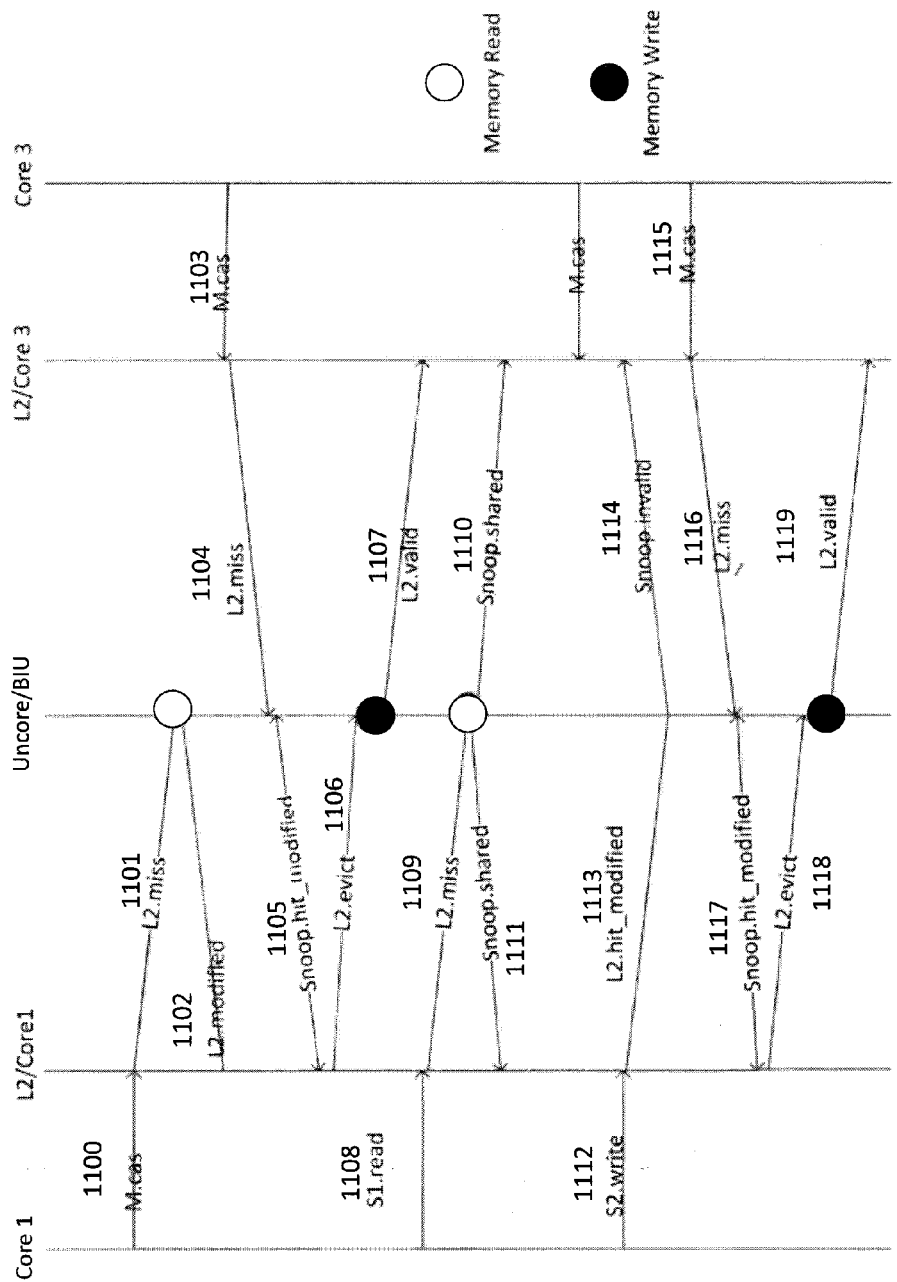
FIG. 11A illustrates a transaction diagram showing memory reads and memory writes.
Figure 11B:
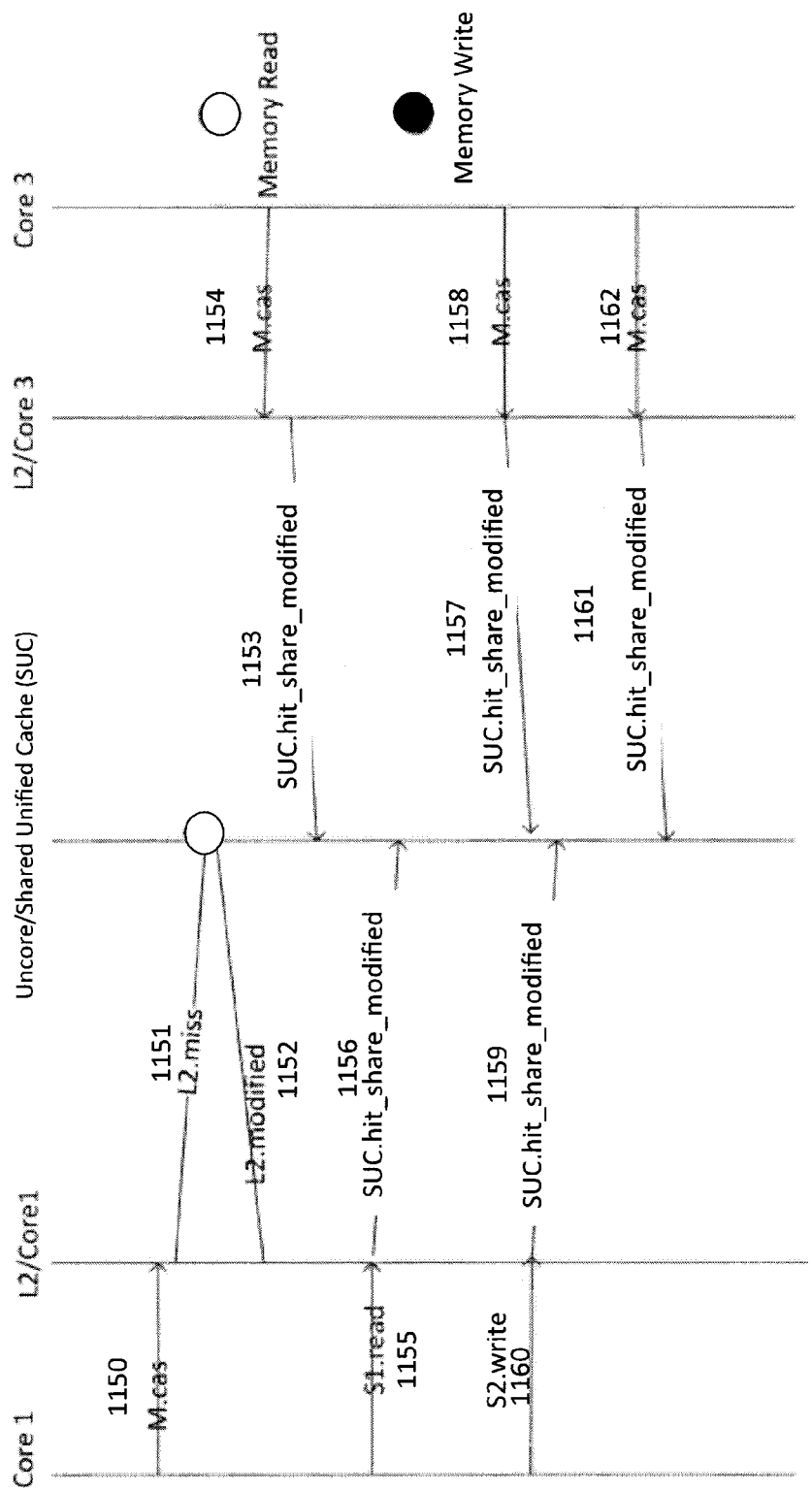
FIG. 11B illustrates a transaction diagram showing memory reads and memory writes for a share-only unified cache.

FIGS. 11A-B illustrates the differences between cache behaviors when two cores from two different modules share the same critical region. FIG. 11A illustrates existing runtime cache behavior (e.g., for an existing processor) and FIG. 11B exhibits cache behavior when one embodiment of the invention is employed. In this example, a critical region is shared by multiple cores guarded by a mutex variable, M, and a set of variables, S1, S2, etc, which are accessed in this critical region.

```
get-mutex(M) {
    share-variables: S1, S2 ...
    RD(S1);
    WR(S2);
    ...
} release_mutex(M)
```

In this example, it is assumed that the variables M, S1, S2 are arranged in the same cache line. FIGS. 11A-B assumes that the mutex is accessed through a compare-and-swap (CAS) atomic transaction.

Turning first to FIG. 11A, the CAS transaction is initiated from core 1 at 1100 (M.cas). There is an L2 miss 1101 which results in a memory read operation 1102 which retrieves a copy of the cache line containing M, S1, and S2 from the uncore/BIU. Core 3 initiates a CAS atomic transaction in operation 1103 and there is an L2 miss at 1104. Because a copy of the cache line resides in the L2 of core 1, a snoop hit is sent to core 1 at 1105. In response, the cache line is evicted from the L2 cache of core 1 at 1106, resulting in a memory write operation to the BIU (Bus Interface Unit) or SA (system agent). At 1107, the uncore/BIU sends an indication to the L2 of core 3 that the BIU contains a valid copy of the cache line. At 1108, core 1 initiates a read operation for variable S1. There is a L2 cache miss (S1 share the same cache line as mutex variable M and was evicted at 1106) at 1109 and copies of the cache line are sent to core 1 at 1111 and to core 3 at 1110 (with a shared indication). At 1112, core 1 writes to S2, thereby modifying the cache line and at 1113 the uncore/BIU is notified of the modification. A signal is sent to the L2 of Core 3 at 1114 indicating that the cache line has been modified, and core 3 marks the respective L2 cache line as invalid. At 1115, Core 3 initiates a CAS atomic transaction an L2 which results in L2 miss 1116 (was invalid at 1114). Because a copy of the cache line resides in the L2 of core 1, a snoop hit is sent to core 1 at 1116. In response, the cache line is evicted from the L2 cache of core 1 at 1118, resulting in a memory write operation to the BIU (Bus Interface Unit) or SA (system agent) At 1119, the uncore/BIU sends an indication to the L2 of core 3 that the BIU contains a valid copy of the cache line.

In contrast, FIG. 11B illustrates how this set of transactions may be simplified in accordance with one embodiment of the invention. At 1150, the CAS transaction is initiated from core 1. There is an L2 miss at 1151, resulting in a memory read operation in which a copy of the cache line is retrieved form the uncore/shared unified cache (SUC) at 1152. In this particular example, the cache line is in the modified state. At 1154, the CAS transaction requiring the same cache line is initiated from core 3. As a result, the cache line in the SUC transitions to the shared modified state, but no additional read write operations are required. At 1155 a read of the S1 variable is initiated from core 1 resulting in a cache line hit in the SUC at 1156. Similarly, M.cas operation 1158 from core 3 results in a hit to the shared cache line at 1157. At 1160, a write to variable S2 is initiated from core 1 resulting in a cache line hit in the SUC at 1159. Similarly, M.cas operation 1162 from core 3 results in a hit to the shared cache line at 1161. Thus, the use of the shared unified cache results in a greatly simplified, more efficient set of transactions for a cache line which is shared across multiple modules.

The end result is improved performance (particularly for applications which rely on a shared cache), without significant energy consumption. In addition, new features may be enabled by the shared unified cache. For example, memory-direct IO where peripheral devices (such as network interface devices) can access the shared unified cache directly without a round trip through memory. In addition, virtual cache locking may be enabled via the shared unified cache. For example, the replacement policy described above enables a cache entry to be virtually locked through re-filling the LRU replacement counter on the selected cache line.

Embodiments of the invention may include various steps, which have been described above. The steps may be embodied in machine-executable instructions which may be used to cause a general-purpose or special-purpose processor to perform the steps. Alternatively, these steps may be performed by specific hardware components that contain hardwired logic for performing the steps, or by any combination of programmed computer components and custom hardware components.

As described herein, instructions may refer to specific configurations of hardware such as application specific integrated circuits (ASICs) configured to perform certain operations or having a predetermined functionality or software instructions stored in memory embodied in a non-transitory computer readable medium. Thus, the techniques shown in the figures can be implemented using code and data stored and executed on one or more electronic devices (e.g., an end station, a network element, etc.). Such electronic devices store and communicate (internally and/or with other electronic devices over a network) code and data using computer machine-readable media, such as non-transitory computer machine-readable storage media (e.g., magnetic disks; optical disks; random access memory; read only memory; flash memory devices; phase-change memory) and transitory computer machine-readable communication media (e.g., electrical, optical, acoustical or other form of propagated signals— such as carrier waves, infrared signals, digital signals, etc.). In addition, such electronic devices typically include a set of one or more processors coupled to one or more other components, such as one or more storage devices (non-transitory machine-readable storage media), user input/output devices (e.g., a keyboard, a touchscreen, and/or a display), and network connections. The coupling of the set of processors and other components is typically through one or more busses and bridges (also termed as bus controllers). The storage device and signals carrying the network traffic respectively represent one or more machine-readable storage media and machine-readable communication media. Thus, the storage device of a given electronic device typically stores code and/or data for execution on the set of one or more processors of that electronic device. Of course, one or more parts of an embodiment of the invention may be implemented using different combinations of software, firmware, and/or hardware. Throughout this detailed description, for the purposes of explanation, numerous specific details were set forth in order to provide a thorough understanding of the present invention. It will be apparent, however, to one skilled in the art that the invention may be practiced without some of these specific details. In certain instances, well known structures and functions were not described in elaborate detail in order to avoid obscuring the subject matter of the present invention. Accordingly, the scope and spirit of the invention should be judged in terms of the claims which follow.

What is claimed is:

1. A processor comprising:
   a plurality of processor cores grouped into modules, wherein each module has at least two processor cores grouped therein;
   a plurality of level 1 (L1) caches, each L1 cache directly accessible by one of the processor cores;
   a level 2 (L2) cache associated with each module, the L2 cache directly accessible by each of the processor cores associated with its respective module;
   a shared unified cache to store data and/or instructions for each of the processor cores in each of the modules; and
   a cache management module to manage cache lines in the shared unified cache using a first cache line eviction policy favoring cache lines which are shared across two or more modules over cache lines which are shared within one module, and wherein the first cache line eviction policy favors cache lines which are accessed relatively more frequently from the modules, wherein the plurality of processor cores, the plurality of L1 caches, the L2 caches, and the shared unified cache are on a same chip.

2. The processor as in claim 1 wherein further comprising:
   a shared state indicator associated with each cache line, the shared state indicator to indicate to the cache management module whether the cache line shared between multiple modules.

3. The processor as in claim 2 further comprising:
   a counter associated with each cache line in the shared unified cache, the counter having a value usable by the cache management module to determine whether to evict a cache line.

4. The processor as in claim 3 wherein the cache management module sets the counter value to a first specified threshold in response to detecting a hit on a cache line from cores in more than one module.

5. The processor as in claim 4 wherein the cache management module sets the counter value to a second specified threshold in response to detecting a hit on a cache line from cores within the same module.

6. The processor as in claim 5 wherein the second specified threshold is less than the first specified threshold and wherein the cache management module decrements the counter of a cache line in each processor cycle for which there is no hit on the cache line.

7. The processor as in claim 1 wherein the cache management module implements a second cache line eviction policy for the L1 and L2 caches.

8. The processor as in claim 1 wherein each cache line in the shared unified cache includes one or more of the following states:
   a shared state to indicate whether the cache line is being shared between more than one module;
   a modified state to indicate that the cache line has been modified;
   an invalid state to indicate that the cache line is invalid; and
   a module ID (MID) identifying the module which moved the cache line out of the invalid state.

9. The processor as in claim 8 wherein the cache management module includes comparator logic to compare the MID associated with the cache line with an MID of a module causing a hit to the cache line to determine whether the cache line is being shared across two or more modules.

10. A method comprising:
    logically grouping a plurality of processor cores into modules, wherein each module has at least two processor cores grouped therein;
    implementing a first cache management policy with a plurality of level 1 (L1) caches, each L1 cache directly accessible by one of the processor cores, and with a level 2 (L2) cache associated with each module, the L2 cache directly accessible by each of the processor cores associated with its respective module;
    storing data and/or instructions in a shared unified cache for each of the processor cores in each of the modules; and
    managing cache lines in a shared unified cache by a cache management module using a first cache line eviction policy favoring cache lines which are shared across two or more modules over cache lines which are shared within one module, and wherein the first cache line eviction policy favors cache lines which are accessed relatively more frequently from the modules, wherein the plurality of processor cores, the plurality of L1 caches, the L2 caches, and the shared unified cache are on a same chip.

11. The method as in claim 10 wherein further comprising:
    indicating to the cache management module whether the cache line shared between multiple modules using a shared state indicator associated with each cache line.

12. The method as in claim 11 further comprising:
setting a counter associated with each cache line in the shared unified cache, the counter having a value usable by the cache management module to determine whether to evict a cache line.

13. The method as in claim 12 wherein the cache management module sets the counter value to a first specified threshold in response to detecting a hit on a cache line from cores in more than one module.

14. The method as in claim 13 wherein the cache management module sets the counter value to a second specified threshold in response to detecting a hit on a cache line from cores within the same module.

15. The method as in claim 14 wherein the second specified threshold is less than the first specified threshold and wherein the cache management module decrements the counter of a cache line in each processor cycle for which there is no hit on the cache line.

16. The method as in claim 10 wherein the cache management module implements a second cache line eviction policy for the L1 and L2 caches.

17. The method as in claim 10 wherein each cache line in the shared unified cache includes one or more of the following states:
a shared state to indicate whether the cache line is being shared between more than one module;
a modified state to indicate that the cache line has been modified;
an invalid state to indicate that the cache line is invalid; and
a module ID (MID) identifying the module which moved the cache line out of the invalid state.

18. The method as in claim 17 further comprising:
comparing the MID associated with the cache line with an MID of a module causing a hit to the cache line to determine whether the cache line is being shared across two or more modules.

19. A system comprising:
a memory for storing instructions and data;
a graphics processor for performing graphics operations in response to certain instructions;
a network interface for receiving and transmitting data over a network; and
a processor comprising:
a plurality of processor cores grouped into modules, wherein each module has at least two processor cores grouped therein;
a plurality of level 1 (L1) caches, each L1 cache directly accessible by one of the processor cores;
a level 2 (L2) cache associated with each module, the L2 cache directly accessible by each of the processor cores associated with its respective module;
a shared unified cache to store data and/or instructions for each of the processor cores in each of the modules; and
a cache management module to manage cache lines in the shared unified cache using a first cache line eviction policy favoring cache lines which are shared across two or more modules over cache lines which are shared within one module, and wherein the first cache line eviction policy favors cache lines which are accessed relatively more frequently from the modules, wherein the plurality of processor cores, the plurality of L1 caches, the L2 caches, and the shared unified cache are on a same chip.

20. The system as in claim 19 further comprising:
a shared state indicator associated with each cache line, the shared state indicator to indicate to the cache management module whether the cache line shared between multiple modules.

* * * * *